Figure 3:
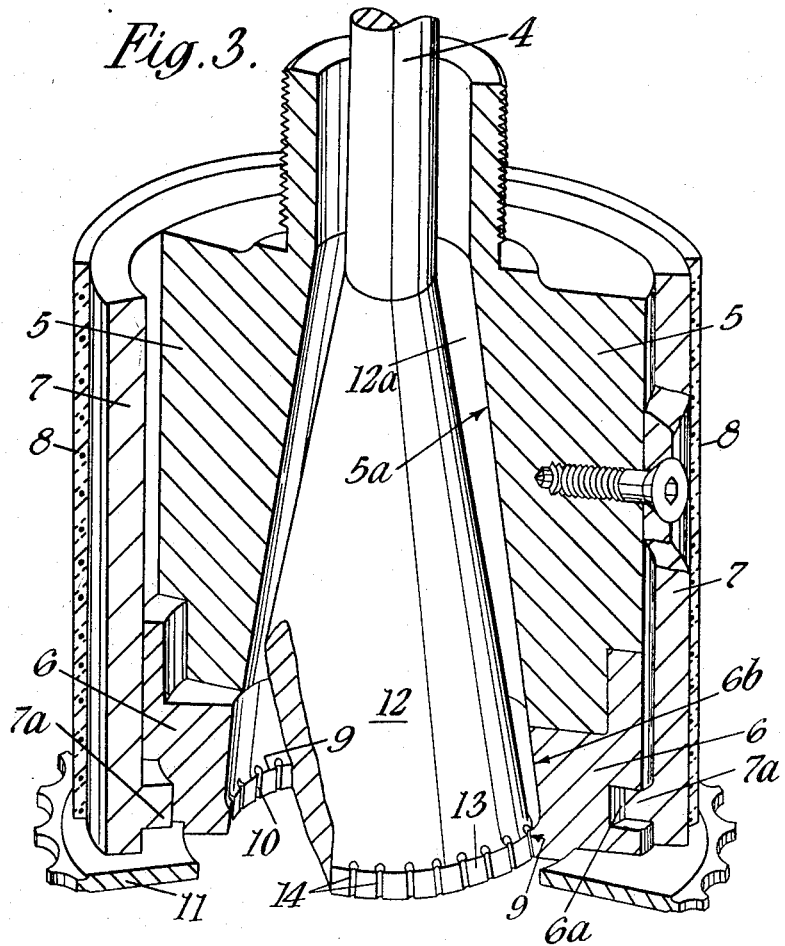

Jan. 5, 1960  F. B. MERCER  2,919,467
PRODUCTION OF NET-LIKE STRUCTURES
Filed Oct. 19, 1956  9 Sheets-Sheet 1
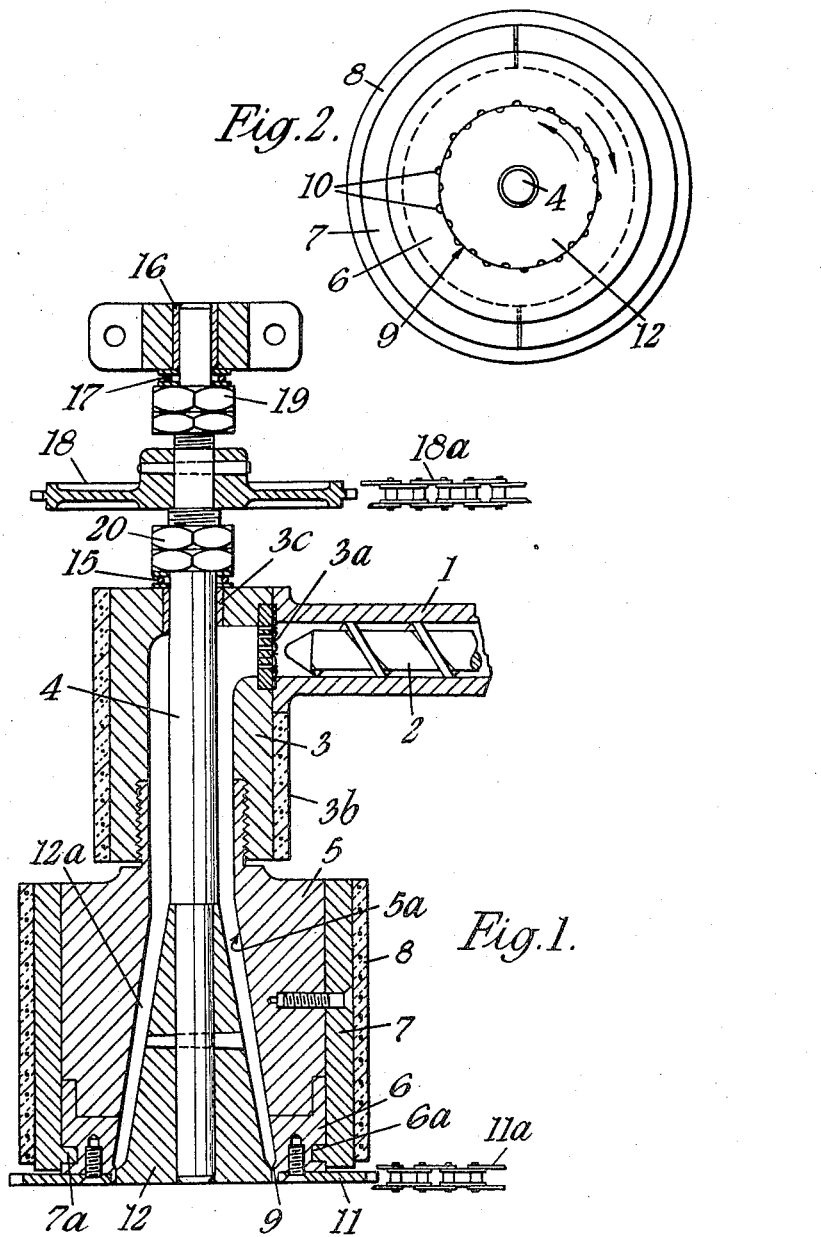
Inventor
F. B. Mercer Inventor
F. B. Mercer Jan. 5, 1960                F. B. MERCER                2,919,467
PRODUCTION OF NET-LIKE STRUCTURES
Filed Oct. 19, 1956                                9 Sheets-Sheet 3
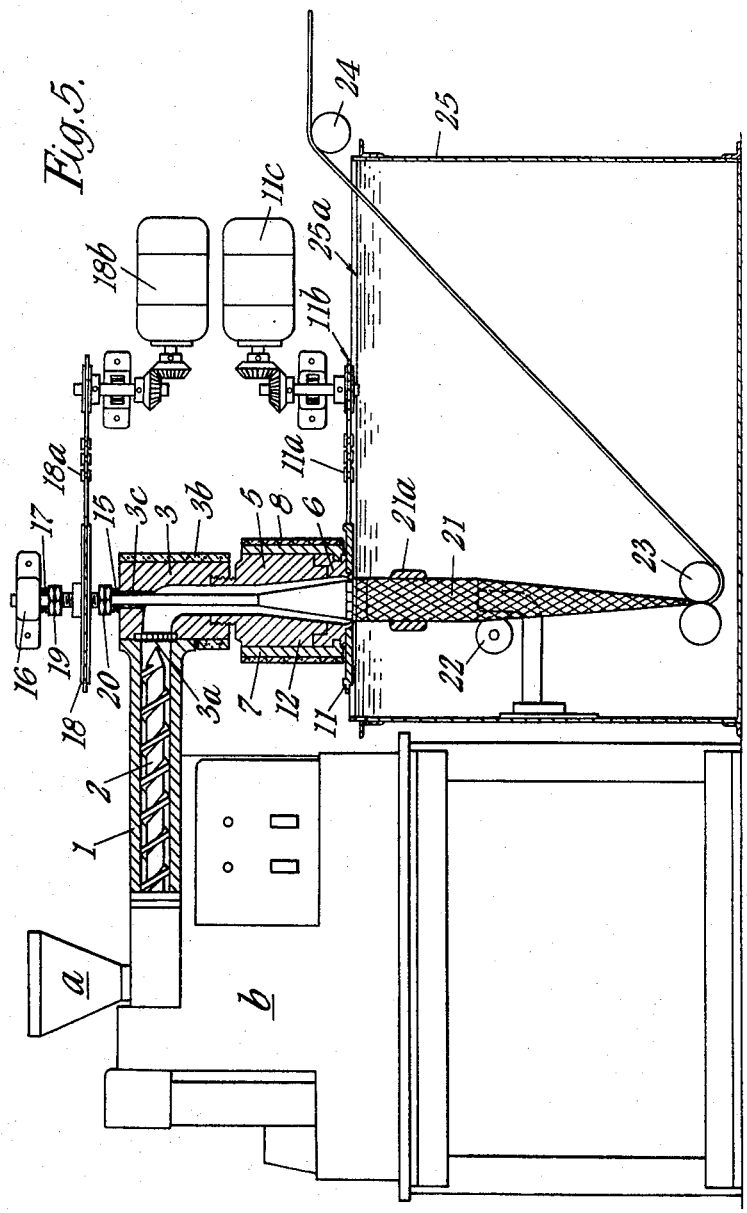
Inventor
F. B. Mercer

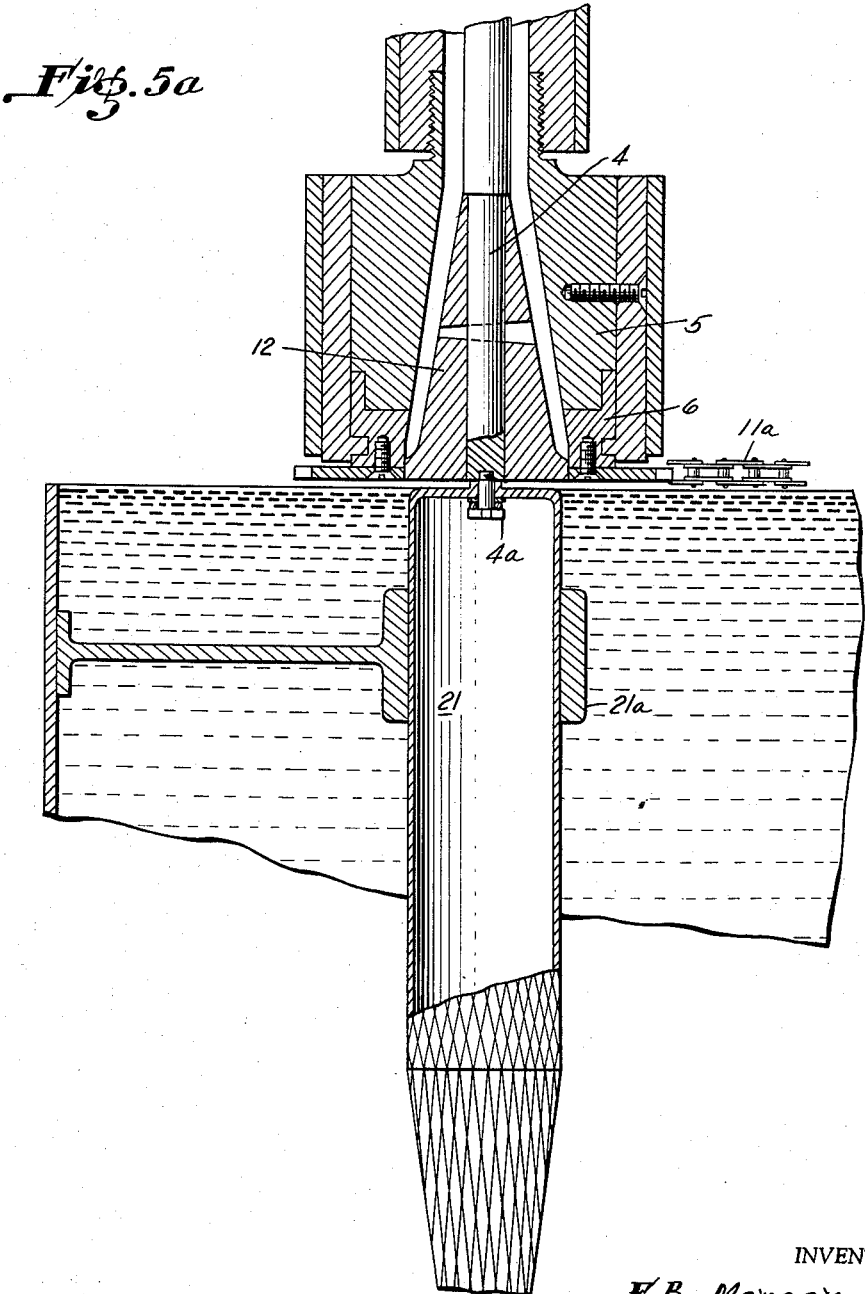

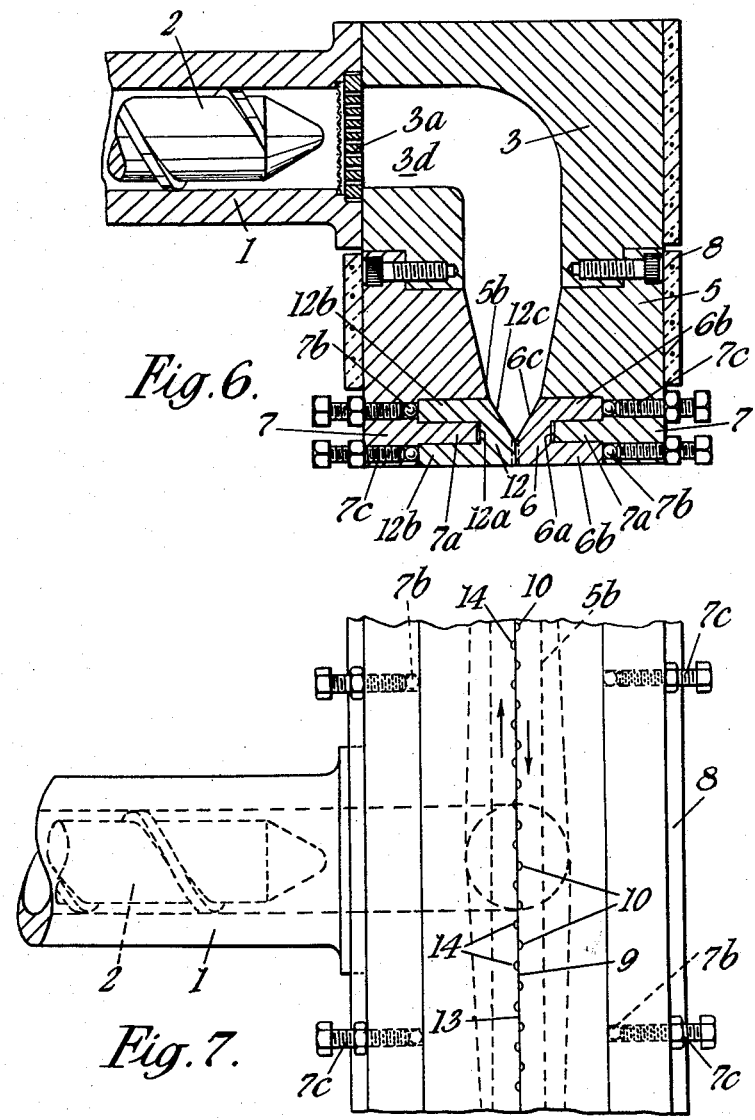

Jan. 5, 1960   F. B. MERCER   2,919,467
PRODUCTION OF NET-LIKE STRUCTURES
Filed Oct. 19, 1956   9 Sheets-Sheet 6
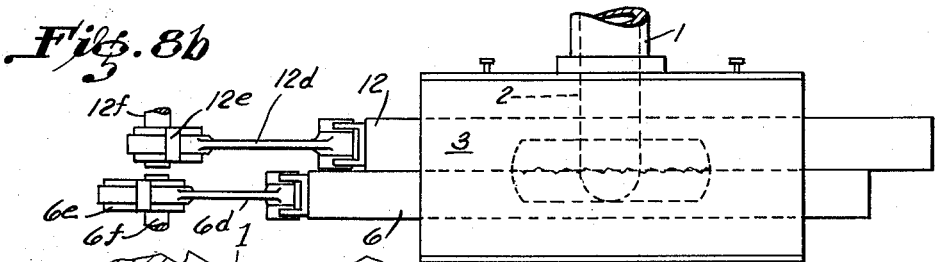
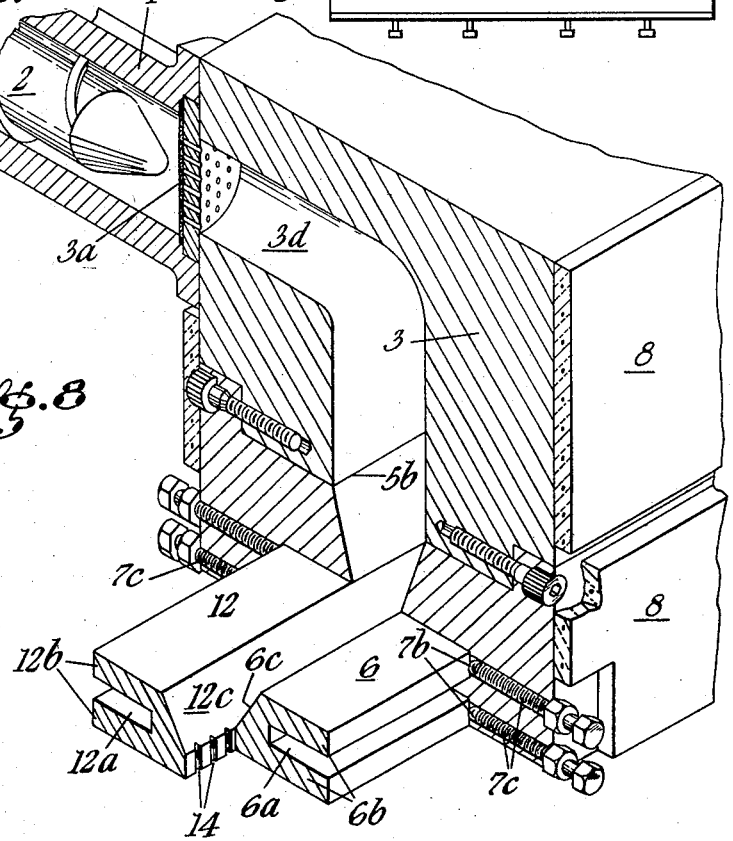
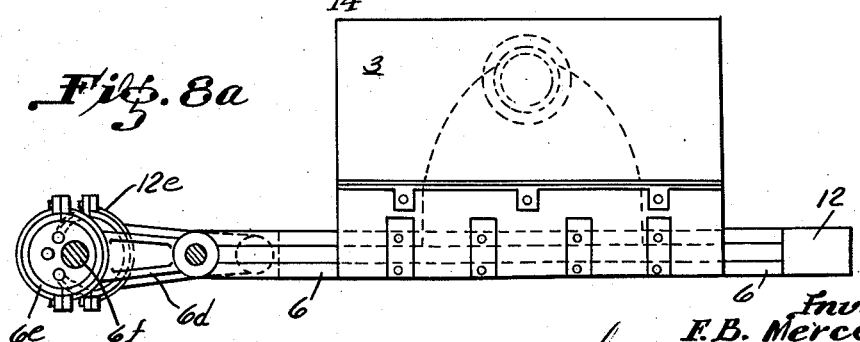
Inventor:
F. B. Mercer Jan. 5, 1960 F. B. MERCER 2,919,467
PRODUCTION OF NET-LIKE STRUCTURES
Filed Oct. 19, 1956 9 Sheets-Sheet 8
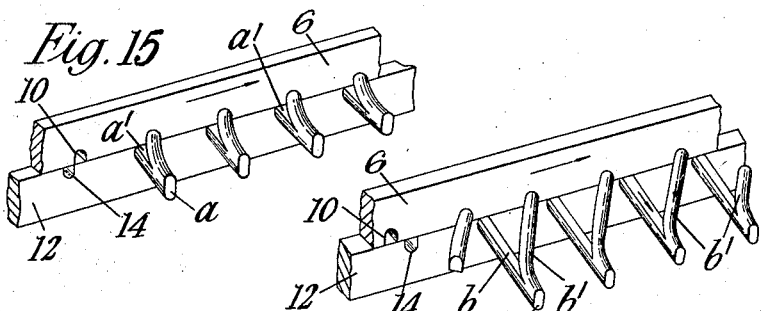
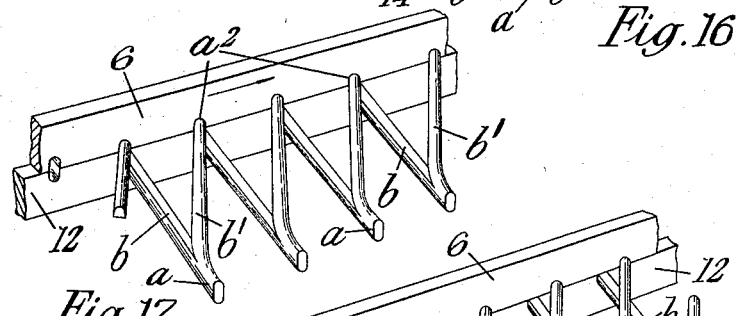
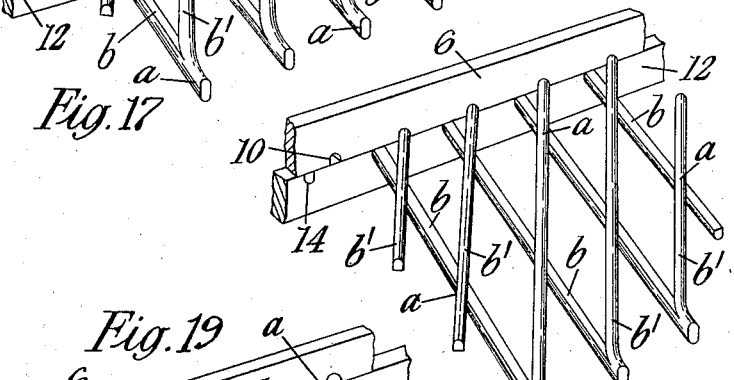
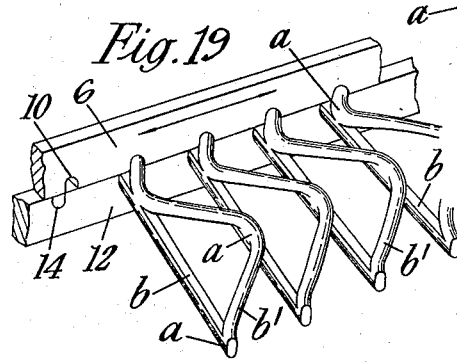
Inventor
F. B. Mercer
By Glascock Downing Seebold
Attys.

Jan. 5, 1960   F. B. MERCER   2,919,467
PRODUCTION OF NET-LIKE STRUCTURES
Filed Oct. 19, 1956   9 Sheets-Sheet 9

Inventor
F. B. Mercer
By Glascock Downing Seebold
Attys.

United States Patent Office 2,919,467
Patented Jan. 5, 1960

2,919,467

PRODUCTION OF NET-LIKE STRUCTURES

Frank Brian Mercer, Blackburn, England, assignor to Plastic Textile Accessories Limited, Blackburn, England Application October 19, 1956, Serial No. 617,161

Claims priority, application Great Britain November 9, 1955

19 Claims. (Cl. 18—12)

The present invention relates broadly to the art of the production of net-like structures.

More particularly, this invention relates to the manufacture of a net or net-like fabric, hereinafter generally referred to as a fabric or net-like structure, from an organic plastic material, as defined hereinafter.

Accordingly, the present invention has for a primary object to provide a method and apparatus for producing a plastic net or net-like fabric in which the product is extruded as a unitary net structure in contradistinction to hitherto proposed methods which involve the extrusion of a series of monofilaments and their subsequent fabrication into a net-like product.

In accordance with this invention, the produced fabric is characterized in that the mesh intersection-forming portions are each composed of an integrally extruded plastic mass and the mesh strand-forming portions are divisions from said intersection-forming portions, the whole fabric thus being an integrally extruded entity.

From one aspect of this invention, the method of manufacturing the plastic net or net-like fabric comprises extruding plastic through dies which are relatively displaceable transversely to the direction of extrusion, each intersection being extruded as a unitary integral stream, the extrusion being continued while each of the intersection-forming streams is divided by displacement of the dies into mesh strand-forming streams, the mesh strand-forming streams being united by die displacement into further intersection-forming streams and the steps of dividing and uniting the streams being repeated to form the net or net-like fabric as an extruded integral entity.

The preferred mode of carrying out this invention as set forth in the preceding paragraph is characterized by extruding the plastic through a pair of die sets which are relatively displaced transversely to the direction of extrusion into positions in which the die orifices of one set are in registration with those of the other set during which extrusion of the intersection-forming streams occurs through the composite registered die orifices and into positions of non-registration of the die orifices of the sets during which extrusion of the mesh strand-forming streams occurs, which are divided with a shearing action out of the said intersection-forming streams.

The invention further consists in apparatus for carrying out the above methods comprising means for feeding plastic under pressure to a pair of die-carrying members having contacting slideways, dies extending through the members with the die discharge orifices at the slideway surfaces and means for displacing the die-carrying members in the said transverse direction for placing the die orifices of each member into positions of registration and non-registration with one another.

The sets of dies may be arranged in an annulus or they may be rectilinear or in an arc and the said relative displacement may be rotary, partial rotary or oscillatory in reference to the annular sets of dies, or where the sets of dies are rectilinear or arcuate the displacement may be reciprocatory or oscillatory.

As the fabric emerges from the extrusion dies it is set or fixed by subsequent treatment according to the nature and requirements of the particular plastic employed and the fixed plastic is taken up by suitable haul off or supporting and gathering-in means.

The term "sets" in reference to the dies has been employed herein and in the claims, as usually each die carrying member will have a considerable number of dies but the word "set" is also intended to include a minimum of a single die on one die carrying member displaceable relatively to and co-operating with a number of dies on the other die carrying member according to the number of strands predetermined for the fabric.

The term "register" or "registration" as used herein and in the claims means the juxtapositioning of the die orifices of the respective sets in their displacement as to coincide or come exactly opposite to one another or into partially overlapping portions, so that each registering pair of die orifices forms a single composite orifice common to both sets of dies, through which each integral intersection is extruded;

By the term "plastic" (as used herein and in the claims) is meant—

(a) A synethetic thermoplastic capable of melt or compression extrusion in a molten state through dies and settable by a cooling medium on issuance from the dies. Suitable thermoplastic materials include polyamides or superpolyamides, such as nylon; polyesters; polyvinylchloride and copolymers thereof with vinylacetate or vinylidine chloride; polythene and the like and cellulose acetate; or (b) Natural or synthetic rubbers, subsequently vulcanized or containing vulcanized agents; or (c) Those thermosetting plastic materials or mixtures thereof with thermoplastic materials, which are capable of extrusion; or (d) Wet spinnable materials, such as viscose, cuprammonium cellulose or protein material (e.g. from soya bean), capable of extrusion and setting by immersion in or spraying with a coagulant as the plastic emerges from the dies.

Further features of the invention will hereinafter appear.

Figure 4:
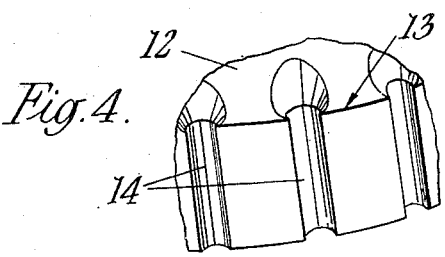

In the accompanying drawings:

Figure 1 is a sectional plan of one form of extrusion apparatus according to the invention in which coaxial annular die-carrying members are employed, Figure 2 is an inverted plan according to Figure 1, Figure 3 is a fragmentary perspective section of the apparatus seen in Figure 1, Figure 4 is an enlarged perspective view of a part of the inner die carrying member seen in Figure 3 illustrating the open sided slot form of extrusion die vertically disposed although such may be located at an angle to the vertical and inclined in the same sense or opposite to that of die displacement, Figure 5 is a general elevation of a circular extrusion machine in which the apparatus of Figures 1 to 3 is shown in section located over a coolant tank and associated with haul off mechanism for the tubular extruded fabric, and means for slitting the tube.

Figure 9:
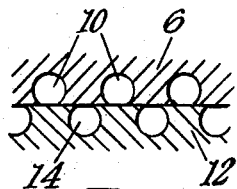
Figure 10:
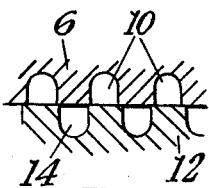
Figure 11:
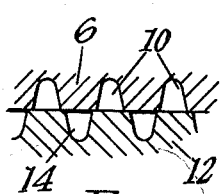
Figure 12:
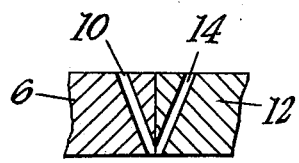

Figure 5a is a fragmentary view on an enlarged scale and in longitudinal section illustrating a means for drawing of a tubular fabric, Figure 6 is a fragmentary sectional elevation of extrusion apparatus of the form employing rectilinear die carrying members, Figure 7 is an inverted plan according to Figure 6, Figure 8 is a perspective enlargement in sectional elevation of Figure 6, Figures 8a and 8b are respectively a fragmentary end elevational view and a top plan view of the arrangement of Figures 6 to 8 and illustrating means for reciprocating the die carrying members, Figures 9 to 11 are cross sectional plans of several of the shapes of die orifices employable in the extrusion apparatus, Figure 12 is a sectional elevation showing a fragment of the die carrying members and illustrating a modified form or arrangement of dies, in which tubular dies are employed which intersect one another to afford the composite single orifices when the parts are in register.

Figures 13 to 18 are perspective diagrams illustrating the principles of extrusion according to the invention in several successive stages, Figure 19 is a perspective diagram illustrating the type of extrusion obtained in using a stationary die carrying member in conjunction with a reciprocatory or oscillatory die carrying member having a stroke equal to the pitch of interval between the dies, and Figures 20 to 25 are diagrams of several of the various fabric patterns produceable according to the invention.

In carrying out the invention according to a melt extrusion mode, described by way of example (see Figures 1, 2, 3, 4 and 5) in which annular co-axial sets of extrusion dies are employed, and between which continuous rotary or oscillatory displacement takes place transversely to the direction of extrusion, the thermoplastic for extrusion is contained in a head or pressure tank or reservoir or hopper a which is heat jacketed or heated in any convenient manner according to known practice. From the tank extends a suitably supported conduit 1, in which a pressure worm 2 is mounted and continuously rotated in known manner to maintain a forced feed from the said tank. The end of the conduit 1 carries and discharges into a feed chamber 3 through a gauze screen and breaker plate indicated at 3a. The chamber 3 has an electrically heated jacket 3b or other heating means in order to maintain the plastic delivered by the worm 2 at an appropriate extrusion temperature. The upper end of the chamber has a gland and bearing 3c for a vertical rotatable shaft 4 and the lower end is coupled to an extrusion chamber 5 secured by a screwthreaded neck or otherwise, the arrangement being such that the two chambers 3 and 5 are fixedly supported with the conduit 1 in a frame or base in any convenient manner on an extrusion machine b of known type as seen on the left of Figure 5.

The cavity of the chamber 5 has a conical wall 5a and supports an outer annular die-carrying member 6 in such a manner that it is capable (in the present instance) of rotation about the axis of the shaft 4. For example, the lower end of the chamber 5 may be rebated to receive an upwardly directed annular flange provided on the die member 6, the externally peripheral wall of which is formed with a race groove 6a. A split cylinder or sleeve 7 is releasably clamped around the chamber 5 and embracing the die member 6, thereby permitting the removal of the die member and replacement by another having a different set of dies.

The cylinder 7 is electrically or otherwise heated by a jacket 8 and has an annular rib or rail 7a located in the groove 6a. The rib and groove serve as a guiding and supporting race for the rotating die member 6.

The lower end of the inner peripheral wall 6b terminates in an annular bevelled or coned slideway 9 in which a set of spaced die ducts or slots 10 of suitable cross-sectional shape are formed. The die member 6 may be rotated by any suitable means, for instance it may have secured to its underside a chain wheel 11, the chain 11a of which is passed around another chain wheel 11b which is driven through gearing from a variable speed electric motor 11c or other suitable source of power.

The shaft 4 carries a replaceable inner or core-like die member 12 which co-operates with the outer die member 6. This inner die member is coned, preferably at a slightly less steep angle than the conical wall 5a, such that the two conical wallings enclose an annular conical distributing passageway or cavity 12a for the plastic.

The lower end of the conical member 12 terminates in a circular or annular slideway 13 which is coned exactly to accord with the coning of the slideway 9 of the die member 6 and the two slideways are carefully ground to a precise fit to provide relatively rotatable contacting edges or surfaces.

The slideway 13 has a set of spaced die ducts or slots 14 situated opposite to the set 10 of the slideway 9. The dies 10 and 14 in the present example are in the form of grooves or slots which are mutually open when in register or coincidence in traversing one another during rotation of the die-carrying members 6 and 12 such that extrusion takes place in common confluently through each registering pair of dies of the two sets, while correspondingly during rotation the dies of each set are cut off from one another and constitute separate and independent extrusion dies as the die slots traverse the ground surface of the slideways intervening between the spaced dies.

The shaft 4 is hung on a ball or roller thrust race 15 above the gland 3c of the feed chamber 3 and the upper extremity of the shaft is steadied in a bearing 16 and a second thrust race is provided at 17.

Between the two races a chain wheel 18 is pinned to the shaft 4 as a convenient means for imparting rotation to the shaft. The chain 18a may be driven from the same or a different source as the chain 11a such as a variable speed electric motor.

On each side of this chain wheel the shaft is screwthreaded for pairs of die-setting adjustable and lock nuts 19 and 20. By the relative adjustment of these nuts, the apropriate sliding engagement is maintained between the contacting edges or surfaces of the slideways 9 and 13. As these surfaces are coned the mating thereof is substantially perfect and can be so maintained during wear by axial adjustment of the shaft 4.

In operation, assuming the die-carrying members 6 and 12 are both continuously rotated by their chain wheels in opposite directions (as shown by the arrows in Figure 2) at the same rate, a fabric will be extruded from the dies in which the strands are laid in a pair of crossing opposite helices. The plastic, in a suitably molten state, is forced by the worm 2 from the pipe 1, through the feed chamber 3 and through the conical annular passageway 12a. As the plastic arrives at the upper ends of the orifices of both sets of dies it is forced therethrough and is continuously extruded through the lower ends of the orifices of the dies. When and while the orifices of dies 10 and 14 of the respective sets are in register with one another, confluent streams of the plastic issue in common through the paired dies, while as rotation proceeds the common streams will each be cut or divided diametrically or chordwise with a shearing action as the dies 10 and 14 separate in passing out of register and begin to traverse the blank contacting portions of the surfaces of the slideways 9 and 13 which intervene between the dies of each set. Each set of dies, in the out of register positions, continues to extrude the plastic independently of the other set. During registration of the sets of dies integral, or, in effect, homogeneous intersections of the meshes of the fabric will be produced, while during the non-registration period each set of dies will produce the strands or legs of the meshes. The cross-sectional area of the intersections will be substantially double, or at least greater than that of the mesh strands.

As the extrusion is continuous throughout the process the rotating dies will continuously and alternately produce intersections and mesh strands and thus extrude an integral fabric of tubular form. The meshes will be of diamond-like shape and their size will depend upon the length of the spacing or pitch interval between the dies of the sets and the helical angle or obliquity of the strands will depend upon the speed of rotation—the faster the speed, the shallower or slower will be the angle or pitch of the crossing helices of the strands, while correspondingly the slower the speed of rotation, the steeper the helical strands will become.

Assuming that the sets have dies of the same cross-sectional area and are rotated at the same rate, the same amount of plastic will be extruded through each set at the registration periods for the intersections and half that amount will be extruded from each die of the respective sets during non-registration periods and mesh strands of uniform but diminished thickness or gauge will be extruded.

The finished form of the fabric as extruded will be tubular but the tubular form may be slit longitudinally to provide a flat fabric as is known in tubular fabric production.

While in the above description it has been assumed that the sets of dies are to be rotated in opposite directions, the apparatus is susceptible of a variety of modifications in the nature of the relative displacement of the sets of dies and this aspect of the invention will be dealt with and explained hereinafter, as also will be effect of variations of size and spacing of the dies and the effects produceable by tensioning or racking of the meshes of the extruded fabric.

The fabric as extruded will be subjected to a setting or fixing treatment as by spraying with or immersing it in a cooling liquid in a tank immediately below the extrusion dies as will be described hereinafter.

In carrying out the invention by the use of rectilinear sets of extrusion dies, which are reciprocated transversely to the direction of extrusion, as exemplified in Figures 6–8 (wherein like references are applied to corresponding parts as have been used with respect to Figures 1–4), the feed pipe 1 and forcing worm 2 deliver molten plastic through the gauze and breaker plate 3a to the feed chamber 3 kept at the appropriate temperature by heater 3b. This chamber has attached to it by screwthreaded or other means, an extrusion chamber 5 (with heaters 8), the cavity of both chambers being elongated or fanned out from the inlet part 3d at right-angles to the plane of the paper in Fig. 8 and seen in the inverted plan of Fig. 7 in dotted lines, to form a narrow rectangular aperture 5b, the extent of which is commensurate with the range of the sets of dies referred to below, including the reciprocating stroke thereof such that all dies are open to the plastic within the extrusion chamber 5.

This chamber in its lower part has downward parallel extensions 7 each of which has an inwardly projecting, longitudinally extending tongue or rail 7a on which the die-carrying members 6 and 12 are respectively guided and slide in their reciprocating displacement. The two oppositely positioned die-carrying members 6 and 12 have rearward rectilinear recesses 6a, 12a which accommodate the rails 7a leaving a forked rail form 6b, 12b, which lies in the recesses above and below the rails 7a. The forked rails 6b, 12b are reciprocated against thrust balls 7b of which the pressure may be adjusted by set screws 7c.

The die members 6 and 12 have bevelled entry surfaces 6c and 12c which terminate at the vertical dividing line between the contacting slideway edges 9 and 13, in each of which is formed a set of dies in the form of laterally open slots or grooves 10 and 14. In Fig. 7 the longitudinal extent of the die members 6 and 12 is not fully shown. Each member has a blank smooth surface in both directions containing no dies, the length of these blanks being somewhat greater than the maximum reciprocating stroke of the die displacement. Sealing gaskets or sealing grooving may be provided to prevent the escape of plastic between the bottom of the cavity of the chamber 5 and the moving surface of the die members.

Any suitable means, such as interchangeable eccentrics or cams or such as cranks and link mechanism, may be provided and driven from any appropriate power source for reciprocating the die members 6 and 12 through a predetermined stroke in opposite directions as indicated by the arrows, Fig. 7. For example, reciprocatory motion may be imparted to both die members 6 and 12 by eccentrics 6e and 12e driven by rotary shafts 6f, 12f from any suitable power source, not shown, and coupled to the respective die members 6 and 12 by connecting rods 6d, 12d.

According to a modification the reciprocating die members may be curvilinear, extending over an arc and be oscillated about the axis of the arc and for purposes of description hereinafter, the curvilinear form is considered as the equivalent of the rectilinear form with the necessary modifications in mounting and set up.

As in the case of the annular rotary die arrangement (Figs. 1–4) so in the rectilinear, reciprocatory or oscillatory die arrangement modifications may be made, and there will be indicated hereinafter variations as to relative displacement, reciprocating stroke, spacing and size of the dies etc. of which the apparatus is susceptible, together with the effects produceable by subsequent treatment by tension, racking or forming under heat and pressure of the extruded fabric.

The annular and the rectilinear extrusion apparatus above described is each mounted, over, or its lower surface immersed in, a bath of cooling liquid, which may be water or other liquid appropriate for setting the particular plastic under treatment as soon as the fabric is extruded from the dies. Alternately, the cooling or fixing of the extruded fabric may be effected by spraying it with cooling liquid or subjecting it to refrigerated air or gas currents.

Within the cooling bath or associated therewith or adjacent the spraying or refrigerating zone, haul off rolls or equivalent means are provided to take up and support the fabric in a manner similar to that adopted in the production of fabrics of known kind.

Appropriate setting or fixing means and haul off apparatus are exemplified in Fig. 5 with respect to the annular extrusion method. The extruded tubular fabric as it emerges from the dies is drawn over a vertical cylindrical support 21 calculated to maintain the diameter of the tubular fabric while setting and to ensure an even haul off.

The support 21 may be surrounded with a tension ring 21a between which and the cylinder the fabric passes and on which the tension ring bears with appropriate friction.

Assuming that a finally flat fabric is required, it is convenient to mount a cutting or slitting wheel 22 below the cylinder 21.

The slit fabric is drawn downwards through a pair of rollers 23 which are driven through variable speed means from a suitable source (not shown).

From the rollers 23 the fabric is carried away as over a roller 24, to a suitable batching or collecting source.

If the setting or fixation is to be by immersion in a liquid the above-described haul off mechanism is located in a coolant tank 25, the level of the liquid in which is indicated at 25a.

Where the final produce is to be a tubular net, the former 21, Figure 5, may be omitted but where it is desired to employ a former when drawing down a net which in final form is tubular, the former 21, as shown in Figure 5a, must be suspended in a manner known in the extrusion of tubular bodies in general instead of being supported from the side of the tank 25. For example, the former 21 may be suspended on an antifriction bearing 4a carried by a set screw secured in the end of the shaft 4.

Alternatively, shaft 4 may be hollow and a suspension rod passed down through this shaft from a suitable support at the upper end and carrying the former 21 at its lower end.

The use of formers and rings such as 21, 21a, is to serve to assist in equalizing the tension applied by the rollers 23, to the plastic net issuing from the die orifices.

For fixing fabric and hauling off initially flat fabric as extruded from the rectilinear die apparatus described, similar appartus as is employed for the tubular fabric may be employed with the omission of the cylinder 21 and tension ring 21a. If desired, the haul off by rollers 23 may be controlled by passing the fabric as extruded between a pair of slightly spaced plates.

It will be observed that for any given extrusion rate and relative displacement speed of the dies, the cross-sectional area of the mesh strands may be diminished and the size of the meshes of the fabric as extruded may be increased by appropriately increasing the haul off rate by the rollers 23.

In the apparatus having annular sets of dies, the relative transverse displacement may take place in the several ways set out hereunder:

(a) The die-carrying members may continuously rotate in opposite directions at the same rate (as above described in reference to Figs. 1–4).

(b) The members may be rotated continuously in opposite directions at different speeds.

(c) The members may be rotated continuously in the same direction but at differential rates such that one set of dies is progressively overtaking the other set to bring about the registration and non-registration positions.

(d) The displacement according to (a) (b) (c) above may be employed but the movement may be stepwise, as effected by ratchet or like gear instead of by continuous rotation, in which case the arrangement may be such that a pause takes place at the die registration positions when the intersections of the mesh will be elongated or it may take place at the non-registration positions when the mesh strands will be elongated. A somewhat similar effect can be attained by varying the speed at which the dies pass one another or move through the positions of non-registration.

(e) The die members may both be oscillated to and fro in opposite sence through a minimum stroke of half the pitch of the spacing interval of the dies.

(f) Of the two die members, one may be stationary and the other may be (1) rotated continuously, when the stationary dies will produce longitudinal strands and the moving dies will extrude helical or oblique strands, or (2) may be oscillated back and forth, when the moving set of dies will afford extruded strands zig-zagging to and from the longitudinal strands issuing from the stationary set of dies. In this kind of displacement the moving set of dies is given a minimum stroke equal to the pitch of the die spacing.

In the case of apparatus embodying the rectilinear sets of dies, the several kinds of oscillatory displacement set out under (e) and (f) and (2) above may be employed (in the form of rectilinear reciprocation).

With apparatus having annular or rectilinear die members the oscillations or reciprocations may be varied as to the stroke of the displacements according to predetermined requirements, such that each die of one set comes into registration alternately with the two adjacent dies of the other set, or each die of one or both sets traverses and registers with several dies of the other set.

Where the dies do not move at the same rate and where one set is stationary, that moving at the faster rate or the moving die will extrude longer filaments or strands than those extruded by the slower moving or stationary dies, and consequently a greater quantity of plastic will be required, and this is supplied by making these dies of greater cross-sectional area than the stationary or slower moving set.

By the several kinds of displacement indicated above, it will be appreciated that the patterns of the extruded fabrics may be varied considerably.

The dies of the respective sets may be duplicates of one another or the shape in cross-section and area of one set may differ from those of the other set. In Figs. 9, 10 and 11 fragments of die-carrying members 6 and 12 are illustrated for convenience in the rectilinear form. In these figures several suitable shapes of die ducts 10 and 14 are shown in cross-sectional plan.

In Fig. 12 is illustrated another form of converging die ducts 10 and 14 in members 6 and 12 where the lower ends of the die ducts are bevelled off and form a common or composite extrusion orifice when they are in register, the area of the orifices being variable by grinding back the under surface of the die-carrying members 6 and 12. Furthermore, the spacing and number of dies in one set may be different from those of the other set, including the case (already indicated) of where one set consists only of a single die, and in some circumstances certain of the dies in either set have a different shape or a different cross-sectional area from other dies of the same set.

In consequence of the many variations, such as indicated herein, a corresponding number of patterns of fabric may be produced.

The diameter of the annular sets of dies and the width of the rectilinear sets, need not be a determining factor in the corresponding dimensions of the extruded fabric as such may become extended considerably, for example by employing low relative displacement speeds in conjunction with closely spaced dies.

Where wet spinning plastics are to be used, the same kind of apparatus as described above is employed, except that the worm feed 2 for the plastic is replaced by a pump feed such as known in wet spinning apparatus for mono-filaments to force the plastic through the die orifices which are immersed in a coagulating bath.

The basic principle and operation of the extrusion according to the invention is exemplified in Figs. 13 to 19 wherein are illustrated the several stages of the extrustion of the plastic from the dies 10 and 14 in the die-carrying members 6 and 12, as described with reference to Figs. 1 to 8, but for convenience the die-carrying members are shown in their rectilinear form, and for convenience where the die member 6 moves and the die member 12 is stationary.

Figure 14:
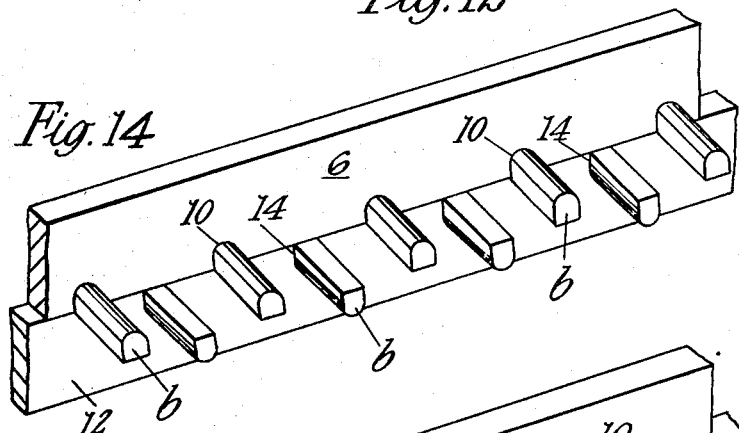
Figure 13:
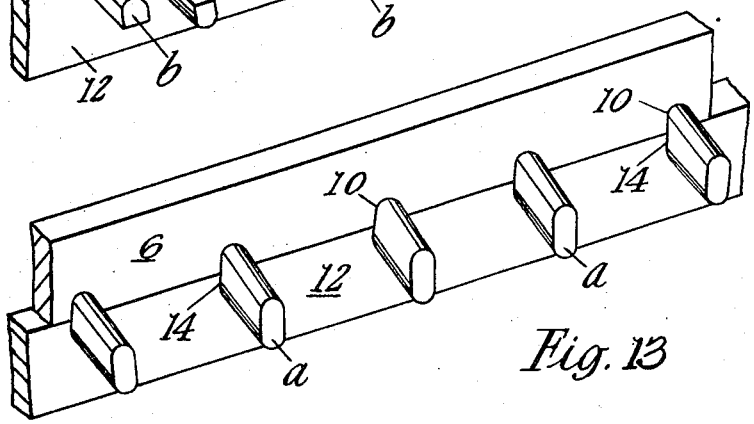

In Fig. 13 the dies 10 and 14 are in exact register forming composite single orifices and confluent extrusion is taking place, thereby producing the integral intersecting portions of the fabric mesh. In Fig. 14, the dies are in an out-of-register position as in the separated extrusion for the mesh-forming strands b. In Fig. 15 the dies 10 and 14 are passing out of register and separating with a shearing action, dividing the mesh intersection masses at a' as displacement of the die sets proceeds. When the dies of each set have passed onto and are passing over the plain surface spacing between the dies 10 and 14, each die functions as a single independent entity and as extrusion and transverse displacement is continuing simultaneously, diverging mesh strands b and b' are being formed (see Fig. 16) until the dies of one set come again into register (see Fig. 17) with those of the other set, when the extrusions taking place through the registered dies of the respective sets merge together again into common extrusions or integral streams to produce another intersecting portion a of the mesh, this process of intersection extrusion and mesh strand extrusion being constantly repeated in the manner illustrated at Fig. 18 in the production of an integral net-like fabric by the continued relative transverse displacement of die. In Figs. 13 to 18 the dies 10 moving continuously as in rotation lay steep helical strands across the longitudinal strands extruded by the dies 14.

In like manner, intersections and mesh strand formation is effected with rotation or oscillation or reciprocation of the dies.

In Fig. 19 the principle of extrusion is exemplified with reference to a stationary die member 12 and the die member 6 constantly reciprocating or oscillating back and forth (as indicated by the arrow) over a stroke equal to one pitch interval of the dies.

Although the dies for many purposes are most suitable in the form of wholly open-sided slots or grooves, as seen most clearly in Fig. 4, die ducts may be employed which are of tubular form and which intersect one another at their lower ends so that they adjoin and form a composite single orifice as described with reference to Fig. 12.

The cross-sectional area of dies employed in this invention may be caried over a considerable range from very fine dies of the order found in the finer type of hypodermic needles for the production of correspondingly fine thread fabrics, to coarse or large cross-sectional areas for the production of stout or heavy duty mesh strands. It will be appreciated that the size of the meshes will depend upon the spacing of the dies of the sets relative to one another of each set and the rate of displacement in relation to the extrusion pressure rate and the haul off speed.

Closed figure die ducts or passageways may be formed in the die-carrying members and lined with tubes (down to the fine hypodermic needle size), the ends of the liner tubes of each set of die passages being bevelled in oppositely facing sense obliquely across a suitable portion thereof, which may be a major portion of the diameter of the tubes where the finer size of die orifices are required, the lower limit as to size being determined by the practicability of extrusion of any particular plastic therethrough. After insertion of the liners the liner tube end may be bevelled in grinding the contacting surface of the slideways, such as 9 and 13, to a perfectly smooth mating finish.

It will be understood that in producing the fine strand fabrics the spacing of the dies of each will be correspondingly reduced, and in any case the mesh size may be diminished by reducing the said spacing, the minimum being not less than the diameter or transverse dimensions of the dies.

With the apparatus provided with the annular sets or the rectilinear sets of dies subjected to oscillation or reciprocation, a series of separate narrow fabrics, braids or ribbons may be extruded simultaneously from the die-carrying members instead of a full-width fabric, by arranging each set of dies in a plurality of groups each separated from one another by plain dieless portions of suitable extent and by limiting the length of the oscillatory or reciprocatory stroke to the traversal of a die group.

Although the above description has been confined to apparatus having annular rotary die sets, which is the preferred form, or rectilinear reciprocating dies, there are doubtless other forms of apparatus capable of carrying out the invention, for example there may be employed extrusion apparatus having endless steel bands disposed edge to edge, the laps of which are appropriately spaced by guide and drive rollers. At said edges opposite sets of dies are located. The bands may be run continuously or in reciprocation below and in closure of the aperture of an extrusion chamber.

Instead of moving both bands, one may be held stationary or a stationary die-carrying plate may be substituted for one of the bands with its die edge opposite to the die edge of the moving band.

The extrusion chamber may be located externally of and above the extrusion lap, or it may be positioned within the circuit of the band when the extrusion lap will lie below it.

Furthermore, it will be appreciated that the apparatus illustrated for forcing and feeding plastic to the essential dies may be substituted by any suitable known form of extrusion feeding and pressure apparatus.

The fabrics as produced according to this invention may be so stout as to be more or less self-sustaining meshed sheets or they may have different degrees of flexibility and in the finer meshes the fabric may be so flexible as to fall in folds or be capable of draping.

High rates of production of the extruded fabric may be accomplished as such is only limited by the possible rates of extrusion and fixation, and as the fabric is completed in a substantially single continuous process, eliminating the spinning of yarns or monofilaments and the subsequent weaving or other fabrication into cloth or the like, manufacturing costs should be low.

Figure 20:
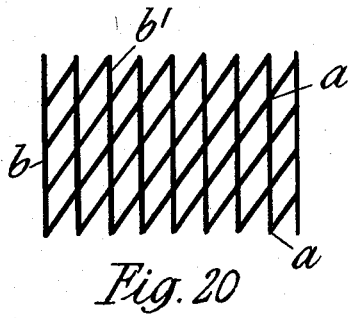
Figure 21:
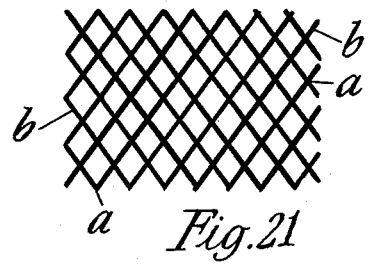
Figure 22:
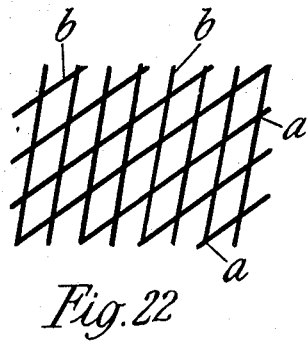
Figure 23:
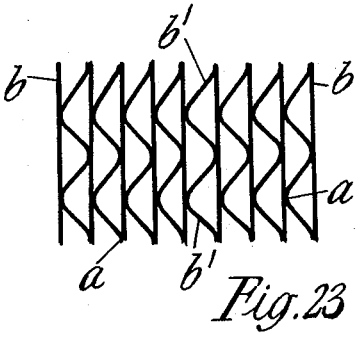
Figure 24:
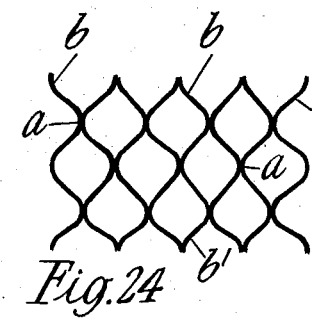
Figure 25:
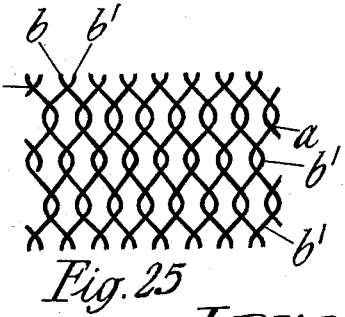

Representative fabric patterns are illustrated in Figs. 20 to 25 as examples of several of the various die displacements. In Fig. 20 a fabric is shown in which longitudinal strands issue from stationary dies and steep helical strands issue from the moving dies (see also Fig. 18). In Fig. 21 a fabric is shown as produced where both sets of dies rotate in opposite directions, while when dies move in the same direction but at differential speeds a fabric as illustrated in Fig. 22 is produced. The fabric of Fig. 23 corresponds with that illustrated in formation in Fig. 19, and that shown in Fig. 24 is produced by reciprocating or oscillating both sets of dies in opposite directions with a stroke equal to one-half pitch of the spacing interval of the dies. In Fig. 25 a similar fabric is shown to that of Fig. 24 but in this instance the stroke is equal to one-half die interval pitch plus a fraction.

The fabrics after extrusion and fixation may constitute the finished article or such may be subjected to further treatment or treatments according to the products it may be desired to market.

The shape or size of the meshes of the fabric as extruded, may be changed, enlarged or diminished by the application of racking tension when using drawable plastic such as nylon, polythene or the like, calculated to alter the mesh shape or elongate the mesh strands. Tensioning in one or more directions will elongate the mesh strands while having little effect upon the intersections, and thus the size or area of the meshes may be increased from that which the fabric possessed on extrusion. The shape and size of the meshes, to a lesser extent may be altered or diminished by subjecting the fabric to compression at right-angles to the plane of the fabric to flatten or spread the mesh strands and intersections.

Extruded fabrics may be laminated one upon another under pressure and heat or by cementing or other treatment, or extruded fabrics may be embedded or embodied in or laminated with sheet material, or a sheet or sheets of the same or a different plastic from that extruded.

The extruded plastic may be applied as a coating layer or armouring to one or both sides of plastic, rayon, woolen, cotton, linen and like cloths fabricated by the known methods, by the compression thereon of the extruded fabric in the presence of heat or by the application of adhesives or cements. Other classes of articles may be produced from the extruded fabric by shaping or stretching such on formers or pressing the fabric between die forms to produce containers or three-dimensional articles.

The following list will serve as examples indicating some of the uses or purposes to which the extruded fabric may be put, either initially or by subsequent treatment.

(1) Fabrics of various patterns and textures and braid or ribbon-like material.
(2) Tubular goods or stockinets.
(3) Netting for insect protection, fishing, agricultural, horticultural or sports purposes, etc.
(4) Laminated goods.
(5) The stiffening or reinforcing of other fabrics of known type.
(6) Filtering or sieving.
(7) Armouring upholstery or other fabrics or driving belts, belt conveyors or cables or ropes.
(8) Fabric reinforcement of rubber tires.
(9) Towing targets of net form for aircraft.
(10) Furnishing fabrics such as curtains, tablecloths, counterpanes, etc.
(11) Pan scrubbers.

(12) Baskets, bags or other containers.
(13) Basket chairwork, hammocks, screens or lattices and the like.
(14) Foundation garments or girdles, surgical fabrics such as elastic stockings.
(15) Millinery.

What is claimed is:

1. Method of manufacturing a plastic net-like structure composed of mesh strands and intersections thereof comprising extruding each intersection through cooperating extrusion orifices as integral, unitary intersection-forming streams, continuing the extrusion while dividing each intersection-forming stream about a surface of separation parallel to the opposite faces of the net-like structure when laid flat, to form separate mesh strand-forming streams, reuniting the strand-forming streams into further unitary intersection-forming streams, the division of said intersection-forming streams and the separation into the strand-forming streams and the reuniting into further intersection-forming streams being effected by relatively displacing said streams transversely to the direction of extrusion and continuously repeating the separation into strand-forming streams and the reuniting into the intersection-forming streams to thereby extrude the net-like structure as an integral entity.

2. The method of forming an integral plastic net-like structure comprising plastic strands extruded together into an integral network comprising extruding plastic through a plurality of die orifices distributed in a series, said orifices being formed between relatively movable die members whereby a portion of each orifice is disposed in one movable die member and a complementary portion of said orifice is disposed in another die member, and moving the die members relatively to one another transversely to the direction of extrusion as the extrusion continues whereby alternately to form intersection extrudates and strand-forming extrudates separated from the said intersection extrudates by a shearing action of the die members in their transverse motion.

3. Method of manufacturing a plastic net-like structure by extruding the plastic through dies which are relatively displaceable transversely to the direction of extrusion, comprising extruding each intersection as a unitary integral intersection-forming stream, continuing the extrusion while dividing each of the intersection-forming streams about a surface of separation parallel to the opposite faces of the net-like structure when laid flat, to form separate mesh strand-forming streams, reuniting the strand-forming streams into further integral intersection-forming streams, and repeating the steps of dividing and reuniting to form the net-like structure as an integral extruded entity.

4. The method of manufacturing a continuous plastic net-like structure having mesh intersections and mesh strands by extrusion of plastic through sets of dies having outlet orifices relatively displaceable transversely to the direction of extrusion to form on emerging from the orifices a net-like structure as an integral extruded entity comprising extruding each intersection as an integral mass, repeatedly relatively transversely displacing the sets to establish a shearing action within the dies to divide the masses while continuing the extrusion to provide mesh strands homogeneous with said masses and to reunite the mesh strands to form further homogeneous intersection masses.

5. The method of manufacturing a continuous plastic net-like structure having mesh intersections and mesh strands by extrusion of plastic through sets of dies having outlet orifices relatively displaceable transversely to the direction of extrusion to form on emerging from the orifices a net-like structure as an integral extruded entity comprising extruding mesh intersections as integral masses each through a single composite orifice comprising orifices of the respective sets when temporarily in register with one another and repeatedly dividing the said masses by transverse shearing action by displacing the said registered orifices transversely to the direction of extrusion while continuing extrusion through the displaced orifices to provide mesh strands, integrally interconnected with said masses, whereby the net-like structure emerges from the dies as an extruded integral entity.

6. The method as claimed in claim 1 and subsequently treating the integral extruded net-like structure to set the plastic.

7. The method of forming an integral plastic net-like structure comprising plastic strands and mesh intersections extruded into an integral network including continuously extruding plastic through relatively displaceable coaxial die carrying members each having die orifices and at least one die-carrying member having a series of laterally spaced die orifices, while imparting relative rotary motion in a plane transverse to the direction of extrusion to alternately place the die orifices of the respective die-carrying members in successive relative in-register and out-of-register positions, such that with the die-orifices in the out-of-register position mesh-forming strands are extruded, while in the in-register position integral mesh intersections are extruded and the movement from in-register position to out-of-register position laterally shears the intersections into mesh strands, whereby the intersections are of larger cross-sectional area than the respective strands.

8. The method as claimed in claim 2 wherein the moving of the one die member with respect to the other comprises imparting relative reciprocatory movement to the members.

9. The method as claimed in claim 2 and subjecting the extruded net-like structure to tension to elongate the extrudates.

10. In apparatus for continuously extruding a plastic net-like structure as an integral extruded entity, a pair of displaceable die-carrying means each having a contacting surface, the surface of one die-carrying means sliding upon the surface of the other die-carrying means, said surfaces extending in the direction of extrusion and transversely thereof, said die-carrying means having sets of cooperating complementary die-forming orifices provided therein and adapted to be fed with plastic under pressure, means supporting said die carrying means for relative displacement transverse to the direction of extrusion while maintaining said surfaces in sliding contact, and means for relatively displacing the die-carrying means so that the orifices of the respective sets are moved into and out of registration one with another during extrusion.

11. Apparatus as claimed in claim 10 in which the said contacting surfaces of the respective die-carrying means have open slots therein defining dies, the said slots terminating in extrusion delivering orifices, which when in-register constitute composite extrusion orifices for forming integral intersection masses.

12. Apparatus as claimed in claim 10 in which said die-carrying means have tubular passages therein terminating in extrusion outlet openings in the respective surfaces which interconnect at the contacting surfaces when the orifices of the respective sets are in registration so as to define composite extrusion orifices for forming integral intersection masses.

13. Apparatus as claimed in claim 10 and haul-off means operatively associated with the die-carrying means downstream thereof in the direction of extrusion.

14. Apparatus for manufacturing an extruded plastic net-like structure comprising oppositely disposed relatively displaceable die-carrying members having contacting slideway surfaces extending in the direction of extrusion and transversely thereof, a set of extrusion dies in association with each of said surfaces, said dies each having respective inlet and outlet ends, means for feeding plastic under pressure to the inlet ends, and means for effecting relative displacement of the die-carrying members transverse to the direction of extrusion while maintaining said surfaces in contact so that the outlet ends of the respective dies in the sets of dies are moved into and out of registration one with another during extrusion.

15. Apparatus for manufacturing an extruded plastic net-like structure comprising pressure feed means for feeding plastic material, an extrusion chamber in communication with said feed means and into which the plastic is forced, paired relatively displaceable die-carrying members having contacting slideway surfaces extending in the direction of extrusion and transversely thereof, a set of extrusion dies in association with each of said surfaces, said dies being in constant communication with said extrusion chamber so as to afford continuous extrusion through the dies, means for effecting relative displacement of the die-carrying members transverse to the direction of extrusion while maintaining said surfaces in sliding contact so that the sets of dies are moved into and out of registration one with another during extrusion, and means for treating the plastic net-like structure as extruded to fix it.

16. Apparatus as claimed in claim 14 in which said relatively displaceable die-carrying members comprise a pair of coaxially arranged circular members and the means for effecting relative displacement of the die-carrying members including means for imparting relative rotary movement to the circular members.

17. Apparatus as claimed in claim 16 in which the means for imparting relative rotary motion to the members comprises means for rotating both members.

18. Apparatus as claimed in claim 14 in which the die-carrying members are rectilinear members, means for supporting the same for relative reciprocation and the means for effecting relative displacement of the members including means for imparting relative reciprocatory movement to the members.

19. The method of manufacturing a plastic net-like structure as claimed in claim 1 in which the plastic being extruded is a drawable plastic and further including treating such extruded net-like structure to set the plastic thereof and then tensioning such a treated net-like structure in at least one direction so as to increase the area of the meshes.

References Cited in the file of this patent

UNITED STATES PATENTS

| | | |
|---|---|---|
| 692,467 | Mugnier | Feb. 4, 1902 |
| 2,250,967 | Riddle | July 29, 1941 |
| 2,434,532 | Wurzburger | Jan. 13, 1948 |
| 2,581,614 | Veit | Jan. 8, 1952 |
| 2,585,156 | Montross | Feb. 12, 1952 |
| 2,723,424 | Veit | Nov. 15, 1955 |
| 2,738,298 | David et al. | Mar. 13, 1956 |
| 2,752,276 | Woock | June 26, 1956 |

FOREIGN PATENTS

| | | |
|---|---|---|
| 774,212 | France | Dec. 3, 1934 |

UNITED STATES PATENT OFFICE

CERTIFICATE OF CORRECTION

Patent No. 2,919,467                                                                               January 5, 1960

Frank Brian Mercer

It is hereby certified that error appears in the printed specification of the above numbered patent requiring correction and that the said Letters Patent should read as corrected below.

Column 2, line 26, for "synethetic" read -- synthetic --; column 6, line 62, for "produce" read -- product --; column 7, line 41, for "sence" read -- sense --; column 9, line 11, for "caried" read -- varied --.

Signed and sealed this 15th day of March 1960.

(SEAL)
Attest:

KARL H. AXLINE
Attesting Officer

ROBERT C. WATSON
Commissioner of Patents